Patented Sept. 16, 1947

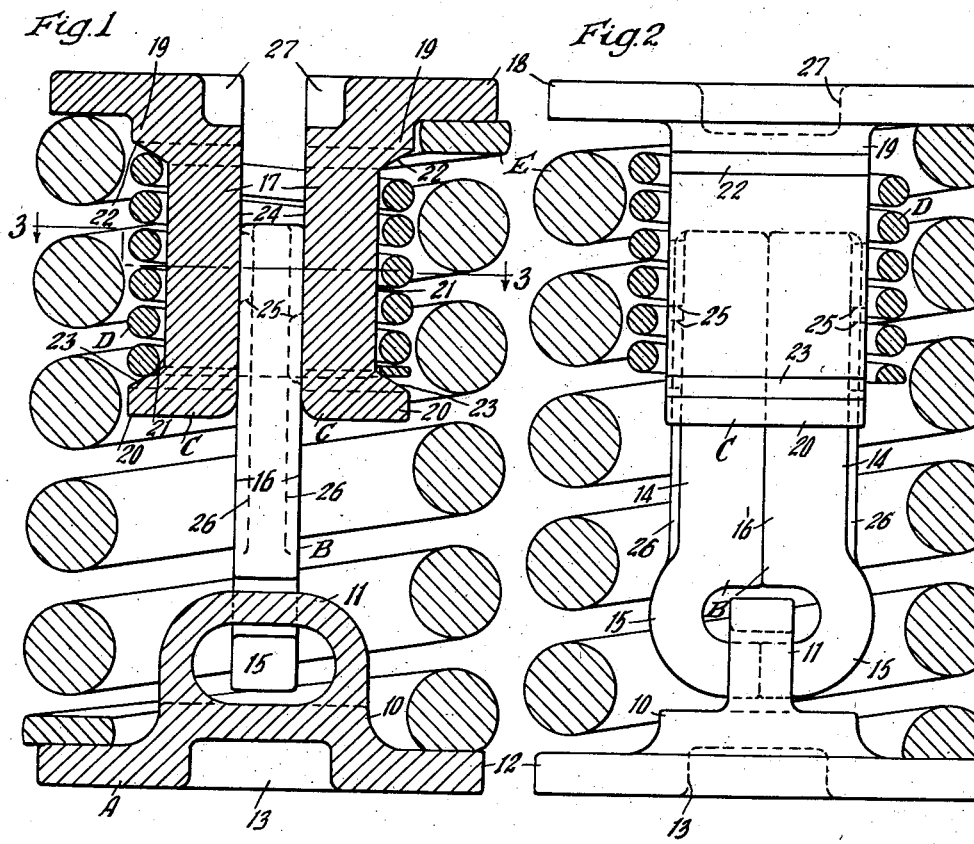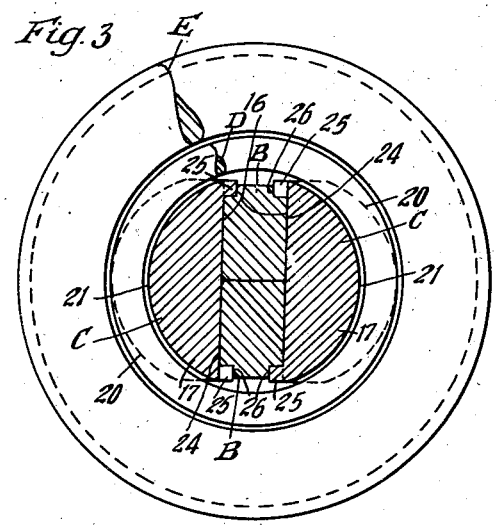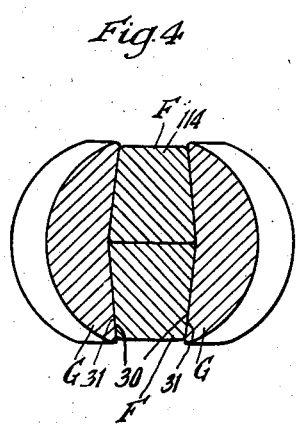

2,427,415

UNITED STATES PATENT OFFICE 2,427,415

FRICTION SHOCK ABSORBER

Roland J. Olander, Chicago, Ill., assignor to W. H. Miner, Inc., Chicago, Ill., a corporation of Delaware Application August 19, 1944, Serial No. 550,172

4 Claims. (Cl. 267—9)

This invention relates to improvements in friction shock absorbers, especially adapted for use with truck springs of railway cars for dampening or snubbing the action of the springs.

One object of the invention is to provide a simple and efficient shock absorber adapted to replace one or more of the spring units of a spring cluster of a railway car for snubbing the action of said cluster, wherein the snubbing action is effective to dampen only those oscillations of the springs which are of an amplitude considered injurious to the car or its lading, thereby greatly reducing wear of the parts of the shock absorber, which would otherwise occur during the small spring movements constituting the majority of movements to which the truck springs are subjected in service.

Another object of the invention is to provide a shock absorber of the character set forth in the preceding paragraph, including a follower member, a friction post connected to the follower member, and friction shoes having lengthwise sliding frictional engagement with the post, wherein relative lengthwise movement of the shoes and the follower is resisted by spring means and the connection between the post and the follower provides for a predetermined amount of lost motion therebetween, whereby relative movement of the post and shoes to provide snubbing action is effected only upon compression or expansion of the truck springs to an extent to produce oscillations or vibrations which without being dampened or snubbed would be injurious to the car and its lading.

A more specific object of the invention is to provide a shock absorber having initial pure spring action followed by frictional action after a predetermined compression of the device, including an end follower; friction means comprising friction shoes and a friction post with which the shoes have sliding frictional contact; and a spring yieldingly opposing relative movement of the follower and shoes, wherein the post has a lost motion connection with said follower to permit movement to a limited extent of the post in unison with the shoes and with respect to said follower to render said friction means temporarily ineffective and produce said initial pure spring action.

Other objects of the invention will more clearly appear from the description and claims hereinafter following.

In the drawing forming a part of this specification, Figure 1 is a central, transverse, vertical sectional view of my improved shock absorber. Figure 2 is a side elevational view, looking from right to left in Figure 1, the springs of the device being shown in vertical section. Figure 3 is a horizontal sectional view, corresponding substantially to the line 3—3 of Figure 1. Figure 4 is a horizontal sectional view, similar to Figure 3, with the springs omitted, illustrating another embodiment of the invention.

Referring first to the embodiment of the invention illustrated in Figures 1, 2, and 3, my improved shock absorber comprises broadly a follower A; a two-part vertically split friction post B anchored to the follower; two friction shoes C—C; a spring D under initial compression surrounding the shoes and in wedging engagement therewith; and a heavy coil spring E surrounding the shoes and post and opposing relative lengthwise movement of the shoes and the follower A together with the post which is anchored to the follower.

The follower A is in the form of a disclike plate having a central boss 10 at the upper side thereof. Upstanding from the boss 10 is a transversely disposed eye member 11 to which the post B is anchored. The opening of the eye member 11 is relatively large and elongated transversely, as clearly shown in Figure 1. At the periphery thereof, the follower A presents a horizontally disposed, annular flange 12 on which the bottom end of the spring E rests. To accommodate the usual spring centering projection of the lower spring follower plate of the cluster of truck springs of the railway car, a central, downwardly opening recess or seat 13 is provided in the follower disc.

The friction post B comprises two similar sections 14—14, which together form the complete post, which is in the form of a relatively wide, rectangular plate. Each section 14 of the post B is in the form of an elongated flat bar of rectangular cross section having a downwardly projecting hook portion 15 at the lower end thereof. In the assembled condition of the post, the vertical inner edges of the sections 14—14 are in abutment throughout their lengths along the vertical center line of the post, and the extremities of the hook portions 15—15 are also in abutment with each other on said central vertical line. The hook portions 15—15 together form a complete eye member which cooperates with the eye member 11 of the follower A to anchor the post to the latter. In connecting the post B to the follower A, the two hook portions 15—15 of the former are engaged within the opening of the eye member 11 by bringing the sections 14—14 of the post together from opposite sides of the eye. The opening of the eye member formed by the hooks 15—15 is relatively large and transversely elongated, as most clearly shown in Figure 2. As shown in Figures 1 and 2, the portion of the eye member 11 which extends through the opening of the eye member of the post is of a thickness to provide considerable vertical play in said opening and the portions of the hooks 15—15 which extend through the eye 11 of the follower A also have considerable vertical play in said opening. As will be evident, the post B is thus connected to the follower for limited relative vertical movement with respect to the same. In other words, the anchoring eyes of the post and follower provide a lost motion connection therebetween. In its assembled condition, the split post B presents longitudinally extending, flat friction surfaces 16—16 on opposite sides thereof.

The two friction shoes C—C are of identical design, each shoe comprising an upstanding, heavy, platelike member 17, which forms the friction shoe proper, having a laterally outwardly projecting flange 18 at its upper end. The platelike member 17 is laterally outwardly enlarged at its upper and lower ends, as indicated at 19 and 20. The outer surface of the plate 17 of each shoe is transversely rounded, or curved, as indicated at 21, the curved surfaces 21—21 of the two shoes C—C being concentric and of the same radius. The enlargements 19 and 20 are provided with inner wedge faces 22 and 23, which are of conical contour. On the inner side, each shoe presents a longitudinally extending, flat, friction surface 24, which cooperates with the post B. The two shoes C—C embrace the post at opposite sides with the friction surfaces 24—24 thereof respectively engaging the friction surfaces 16—16 of the post. To hold the sections 14—14 of the post against lateral separation, each shoe C is provided with a pair of edge ribs 25—25 projecting from the inner sides thereof and guided in grooves 26—26 provided along the edges of the post at the corresponding sides thereof. The guide ribs 25—25 of each shoe are preferably staggered vertically, that is, the rib at one edge of the shoe is located adjacent the lower end of the same and the rib at the opposite side is at a higher level.

The inner spring D comprises a single coil surrounding the shoes and post and embracing the shoes. The spring D is interposed between the enlargements 19 and 20 of the shoes with the opposite ends bearing on the wedge faces 22 and 23 and is under a predetermined compression. The tendency of the spring D to expand presses the end coils thereof against the wedge faces of the shoes, thus forcing the shoes laterally inwardly into tight frictional contact with the friction surfaces 16—16 of the post.

The spring E comprises a heavy coil surrounding the shoes C—C and the post B and bearing at its top and bottom ends, respectively, on the flanges 18 of the shoes and the flange 12 of the spring follower A.

My improved shock absorber is substituted for one or more of the spring units of a truck spring cluster, being interposed between the usual top and bottom follower plates of said cluster, the flanges 18—18 of the shoes C—C bearing on the top spring follower plate and the follower A bearing on the bottom spring follower plate.

As shown in Figure 1, the upper end portions of the shoes are cut out, or recessed, as indicated at 27—27, to accommodate the spring centering projection of the usual upper spring follower plate of the spring cluster.

The operation of my improved shock absorber, as shown in Figures 1, 2, and 3, is as follows: Upon the cluster of springs of the railway car truck being compressed between the spring follower plates of the truck spring cluster, the friction shoes C—C and the follower A are moved relatively toward each other in lengthwise direction against the resistance of the spring E. Due to the wedging action between the spring D and the shoes, the latter tightly clutch the friction post therebetween, thus effecting movement of the post in unison with the shoes toward the follower A during the initial action of the device. This action continues until relative movement of the post B and the follower A is arrested by the lost motion between these members having been taken up. Upon relative movement of the post and follower being arrested, the shoes C—C slide along the friction surfaces of the post, thereby dampening or snubbing the action of the truck springs. As will be evident, the frictional resistance to relative movement of the post B and the shoes C—C remains constant throughout the compression of the mechanism, the pressure exerted by the spring D being substantially constant during this part of the action.

Upon the spring follower plates of the truck springs being moved apart during recoil of said springs, the expansive action of the spring E forces the shoes upwardly, the post being carried upwardly with the shoes away from the follower A until the lost motion between the follower and post has been taken up, whereupon the shoes are compelled to slide with respect to the post, thereby snubbing the recoil action of the truck springs.

Inasmuch as there is no relative movement between the post B and the shoes until the lost motion between the follower A and the post has been taken up, no snubbing action is produced during compression and recoil of the truck springs of an amplitude less than the amount of lost motion between the follower A and post B. Thus, the vibrations of this small amplitude, which constitute the majority of movements of the truck springs in actual service, do not produce any relative movement of the shoes and post, with the result that the number of times the friction elements are actuated is greatly reduced, thereby materially increasing the life of the device.

From the preceding description taken in connection with the drawing, it will be evident that my improved snubber provides for preliminary spring action regardless of varying loads carried by cars, inasmuch as the device is automatically adjustable for this purpose. The automatic adjustment takes place in the following manner: The weight of a loaded car effects a certain amount of compression of the truck springs, thereby moving the spring follower plates of the spring clusters toward each other, with the result that the snubber is compressed taking up the lost motion. During further compression of the truck springs, when the car is in motion, the friction post is held against downward movement, the lost motion in downward direction having been taken up, and the shoes slide downwardly on the post. Upon recoil of the truck springs, the post being gripped by the shoes is moved upwardly in unison therewith and thus its position with respect to the follower A is adjusted during further compression and recoil of the truck springs to so place the same that the lost motion is available during the movements of small amplitude hereinbefore mentioned.

Referring next to the embodiment of the invention illustrated in Figure 4, the design is identical with that shown in Figures 1, 2, and 3, with the exception that the sectional post is made up of two sections which are laterally outwardly tapered and the friction shoes have correspondingly formed inner surfaces, thereby holding the sections of the post assembled.

The post, which is indicated by F in Figure 4, comprises two similar sections 114—114, which have hook members at the lower ends corresponding to the hook members 15—15 described in connection with Figures 1, 2, and 3. The sections of the post F abut on their inner sides and each section has longitudinally extending, laterally outwardly converging side faces 30—30. The two friction shoes, which are similar to the friction shoes C—C hereinbefore described, are indicated by G—G in Figure 4. The shoes G—G are identical with the shoes C—C with the exception that they have inner, longitudinally extending, V-shaped friction surfaces 31—31 on their inner sides which engage with and embrace the side faces 30—30 and 30—30 of the two sections 114—114 at the corresponding sides respectively of the post F. As will be evident, the V-shaped friction surfaces 31—31 of the shoes G—G form guides which cooperate with the side faces 30—30 of the post F to prevent lateral outward separation of the sections of the post.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a follower having a projecting eye member; of an elongated friction member split lengthwise into two sections, each section having a hook portion formed thereon, the hook portions of said sections being engaged through the eye member of said follower, and having their outer ends abutting to provide a complete eye member, said eye members of the friction member and follower having lost motion therebetween; friction elements embracing said member and being slidable lengthwise with respect to said member, said elements and follower being relatively movable toward and away from each other lengthwise of the mechanism; yielding means forcing said elements against said member into tight frictional engagement therewith; and a main spring yieldingly opposing relative movement of said elements and follower toward each other lengthwise of the mechanism.

2. In a friction shock absorbing mechanism, the combination with a follower having a projecting eye member; of an elongated friction member split lengthwise into two sections, each section having a hook portion formed thereon, the hook portions of said sections being engaged through the eye member of said follower, and having their outer ends abutting to provide a complete eye member, said eye members of the friction member and follower having lost motion therebetween; friction elements embracing said member and being slidable lengthwise with respect to said member, said elements and follower being relatively movable toward and away from each other lengthwise of the mechanism; cooperating guide means comprising interengaging ribs and grooves on said elements and member for holding the sections of said member against lateral separation; yielding means forcing said elements against the post into tight frictional engagement therewith; and a main spring yieldingly opposing relative movement of said elements and follower toward each other lengthwise of the mechanism.

3. In a friction shock absorbing mechanism, the combination with a follower having a projecting eye member; of an elongated friction member split lengthwise into two sections, each section having laterally outwardly converging, longitudinally extending friction surfaces on opposite sides thereof, each section having a hook portion formed integral therewith, the hook portions of said sections being engaged through the eye member of said follower and having their outer ends abutting to provide a complete eye member, said eye members of the friction member and follower having lost motion therebetween; friction elements embracing said member and being slidable lengthwise with respect to the same, said elements having longitudinally extending, transverse, V-shaped surfaces engaging the friction surfaces of the post and holding the sections of said post assembled, said elements and follower being relatively movable toward and away from each other lengthwise of the mechanism; yielding means forcing said elements against the post into tight contact therewith; and a main spring yieldingly opposing relative movement of said elements and follower toward each other lengthwise of the mechanism.

4. In a friction shock absorbing mechanism, the combination with a follower having a projecting eye member; of an elongated friction post split lengthwise into two sections, each section having a hook portion formed thereon, the free ends of the hook portions of said section being engaged within the eye member of said follower from opposite sides of said eye; friction elements having sliding frictional engagement with opposite sides of said post lengthwise thereof, each shoe engaging both sections of the post; means on said shoes for holding the sections of the post against lateral separation; yielding means opposing relative lengthwise movement of said shoes and post; and means for pressing said shoes against said post.

ROLAND J. OLANDER.

REFERENCES CITED

The following references are of record in the file of this patent:

UNITED STATES PATENTS

| Number | Name | Date |
|---|---|---|
| 1,648,303 | Geiger | Nov. 8, 1927 |
| 1,989,157 | Schmidt | Jan. 29, 1935 |
| 1,442,893 | Lewis | Jan. 23, 1923 |
| 2,084,638 | Goodwin | June 22, 1937 |
| 1,075,217 | Maxwell | Oct. 7, 1913 |
| 1,742,002 | O'Connor | Dec. 31, 1929 |

FOREIGN PATENTS

| Number | Country | Date |
|---|---|---|
| 4,120 | Great Britain | 1913 |